United States Patent
Namekawa

(10) Patent No.: US 12,404,451 B2
(45) Date of Patent: Sep. 2, 2025

(54) POLYSILICON FRACTURE OBJECT AND PRODUCTION METHOD THEREFOR

(71) Applicant: Tokuyama Corporation, Yamaguchi (JP)

(72) Inventor: Manato Namekawa, Yamaguchi (JP)

(*) Notice: Subject to any disclaimer, the term of this patent is extended or adjusted under 35 U.S.C. 154(b) by 70 days.

(21) Appl. No.: 17/925,852

(22) PCT Filed: May 20, 2021

(86) PCT No.: PCT/JP2021/019131
§ 371 (c)(1),
(2) Date: Nov. 17, 2022

(87) PCT Pub. No.: WO2021/251095
PCT Pub. Date: Dec. 16, 2021

(65) Prior Publication Data
US 2023/0193133 A1 Jun. 22, 2023

(30) Foreign Application Priority Data
Sep. 6, 2020 (JP) .................. 2020-099757

(51) Int. Cl.
*C09K 13/08* (2006.01)
(52) U.S. Cl.
CPC .................. *C09K 13/08* (2013.01)
(58) Field of Classification Search
CPC ......... C01B 33/02; B65D 77/00; Y02W 30/62
See application file for complete search history.

(56) References Cited

U.S. PATENT DOCUMENTS

| | | | |
|---|---|---|---|
| 7,905,963 B2 * | 3/2011 | Sakai | C01B 33/037 134/28 |
| 9,550,607 B2 | 1/2017 | Vietz et al. | |
| 11,214,892 B2 | 1/2022 | Nishimura | |
| 2010/0001106 A1 | 1/2010 | Schaefer et al. | |
| 2015/0166351 A1 | 6/2015 | Weber et al. | |
| 2019/0391126 A1 | 12/2019 | Namekawa et al. | |
| 2023/0294996 A1 * | 9/2023 | Sakida | C01B 33/02 423/348 |

FOREIGN PATENT DOCUMENTS

| | | |
|---|---|---|
| CN | 110621619 A | 12/2019 |
| EP | 0329163 B1 | 5/1994 |

(Continued)

OTHER PUBLICATIONS

English machine translation of JP2015199619 (2015).*

(Continued)

*Primary Examiner* — Richard M Rump
(74) *Attorney, Agent, or Firm* — CAHN & SAMUELS, LLP

(57) ABSTRACT

A polysilicon fractured product includes fractured pieces including a ridge portion generated by fracturing a polysilicon rod. An average radius of curvature (r) of the fractured pieces is 50 μm or more at a tip end of a ridge portion having an angle of 70° or less. The polysilicon fractured product is obtained by a method including fracturing a polysilicon rod to obtain fractured pieces, and etching at an etching speed of 2.5 μm/min or less to achieve an etching depth of 5 μm or more by immersing the fractured pieces obtained in the fracturing in an etching solution.

17 Claims, 4 Drawing Sheets

(56) References Cited

FOREIGN PATENT DOCUMENTS

| | | |
|---|---|---|
| JP | 3496021 B2 | 2/2004 |
| JP | 2006089353 A | 4/2006 |
| JP | 2009544564 A | 12/2009 |
| JP | 5514081 B2 * | 6/2014 |
| JP | 5726984 B2 | 6/2015 |
| JP | 2015199619 A | 11/2015 |
| JP | 2016070873 A | 5/2016 |

OTHER PUBLICATIONS

English Abstract of JP2015199619A, Nov. 12, 2015.
English Abstract of JP2016070873A, May 9, 2016.
English Abstract of JP2006089353A, Apr. 6, 2006.
English Abstract of JP2002068725A, Mar. 8, 2002 (corresponding to JP3496021B2).
English Abstract of JP5726984B2, Jun. 3, 2015.
English Abstract of CN 110621619A, Dec. 27, 2019.
Extended European Search Report, Sep. 2, 2024, 7 pages.
Intellectual Property Office of Singapore Office Action, Aug. 2, 2024, 12 pages.
English translation of the International Preliminary Report on Patentability for PCT App. No. PCT/JP2021/019131, Dec. 2022.
Intellectual Property Office of Singapore, Office Action for SG 11202260099Y, Mar. 28, 2025, pp. 1-9.

* cited by examiner

1 POLYSILICON FRACTURED PIECE
3 FRACTURING SURFACE
4 ROD SURFACE
2 RIDGE PORTION

CUT SURFACE
TANGENT LINE
RIDGE LINE

POLYSILICON FRACTURE OBJECT AND PRODUCTION METHOD THEREFOR

This application is a U.S. national stage application of PCT/JP2021/019131 filed on 20 May 2021 and claims priority to Japanese patent document 2020-099757 filed on 9 Jun. 2020, the entireties of which are incorporated herein by reference.

TECHNICAL FIELD

The present invention relates to a novel polysilicon fractured product. Specifically, the present invention relates to a polysilicon fractured product capable of preventing resin contamination to an extremely low level when a resin bag typically polyethylene bag is filled with the polysilicon fractured product and transported after being filled, and the polysilicon fractured product is taken out from the resin bag. The present invention also relates to a method for producing the polysilicon fractured product.

BACKGROUND ART

In the case of producing polysilicon by a Siemens method, a product is obtained in a rod shape. Since the polysilicon rod has a diameter of 80 mm to 150 mm and a length of 1000 mm or more, when the polysilicon rod is used in another step, for example, in a single crystal production facility by a Czochralski (CZ) method, the polysilicon rod is generally fractured into an appropriate size and classified as necessary to obtain a product. Further, the polysilicon fractured pieces are subjected to a purification step such as an etching step for removing impurities on a surface, and then packed in a clean resin bag and shipped.

However, when the resin bag filled with the polysilicon fractured product is open and the polysilicon fractured product is taken out, a resin powder generated from the resin bag may adhere to the polysilicon fractured product, which is a carbon contamination source in the single crystal production step and causes a problem.

In the conventional art, the problem of resin powder adhesion is considered to be caused mainly by contacting an inner surface of the resin bag with the polysilicon fractured product due to vibration of the polysilicon fractured product due to vibration during transportation, and various measures have been studied on this problem.

For example, there have been proposed a method of reducing an influence of vibration and preventing scraping of a resin bag filled with a polysilicon fractured product by removing a gas inside the bag to bring the polysilicon fractured product into close contact with the resin bag (Patent Literature 1), or a method of minimizing contamination of a polysilicon fractured product by setting a filling rate of the polysilicon fractured product with respect to a capacity of a resin bag to a specific range (Patent Literature 2). With the above measures, generation of the resin powder in the resin bag can be prevented.

However, although carbon contamination due to resins is effectively prevented according to these techniques, it has been clear upon a confirmation by the present inventors that there is still room for improvement. That is, although the resin powder generated due to the scraping of the resin bag can be prevented to some extent by reducing sliding portions between the inner surface of the resin bag and the polysilicon fractured product, and the resin powder can also be removed by means of winnowing or the like after the transportation, it is has been clear upon studies of the present inventors that even in the polysilicon fractured product from which an amount of the resin powder is reduced or removed in this way, the resin is detected in the order of about several ppm.

CITATION LIST

Patent Literature

Patent Literature 1: Japanese Patent No. 3496021
Patent Literature 2: Japanese Patent No. 5726984

SUMMARY OF INVENTION

Technical Problem

Therefore, an object of the present invention is to provide a polysilicon fractured product capable of preventing resin contamination to an extremely low level when a resin bag is filled with the polysilicon fractured product and transported after being filled, and the polysilicon fractured product is taken out from the resin bag.

Solution to Problem

The present inventors have intensively studied to achieve the above object. As a result, resin components on a surface have been analyzed for polysilicon fractured pieces (hereinafter, also simply referred to as "fractured pieces") constituting a polysilicon fractured product taken out from a resin bag after the resin bag is filled with the polysilicon fractured product and transported, and as a result, components of the resin bag are confirmed. Further, as a result of confirming the surface of the polysilicon fractured product in detail, it has been found that the resin of the resin bag firmly adhered to the surface of the polysilicon fractured product. As a result of a further detailed confirmation, it has been found that the resin is adhered in a concentrated manner at ridge portions formed by fracturing, in particular, a sharp ridge portion in the polysilicon fractured product.

As a result of further studies based on the above findings, the present inventors have succeeded in dramatically reducing the amount of the resin adhered to the polysilicon fractured product by performing such treatment that a radius of curvature at the ridge portion is equal to or more than a specific value, and have completed the present invention.

That is, the present invention provides a polysilicon fractured product including fractured pieces having a ridge portion generated by fracturing a polysilicon rod. An average radius of curvature (r) at a tip end of a ridge portion having an angle of 70° or less (hereinafter, also referred to as a specific ridge portion) of the fractured pieces is 50 μm or more.

The characteristic configuration is particularly effective for a polysilicon fractured product having an average particle diameter of 20 mm to 100 mm, and is thus preferred.

The present invention also provides a polysilicon package filled with the above polysilicon fractured product in a resin bag.

Further, the polysilicon fractured product according to the present invention can be preferably produced by a method including a fracturing step of fracturing a polysilicon rod to obtain fractured pieces, and an etching step of performing etching at an etching speed of 2.5 μm/min or less to achieve an etching depth of 5 μm or more by immersing the fractured pieces obtained in the fracturing step in an etching solution.

Advantageous Effects of Invention

In the polysilicon fractured product according to the present invention, since the polysilicon fractured product is treated such that the radius of curvature at the tip end of the specific ridge portion is equal to or more than a specific value, adhesion of a resin to the polysilicon fractured product due to contact with an inner surface of the resin bag can be extremely effectively prevented. Therefore, when a resin bag is filled with the polysilicon fractured product and transported, and the polysilicon fractured product is taken out, an adhesion amount of the resin of the inner surface of the resin bag to a surface of the polysilicon fractured product can be effectively reduced. In addition, by increasing the radius of curvature at the tip end of the specific ridge portion, generation of a resin powder due to scraping of the resin bag can also be effectively prevented.

The present invention proposes means for preventing resin contamination of the polysilicon fractured product in a viewpoint different from that of conventional resin contamination prevention means that is devised to limit vibration of polysilicon fractured pieces in the resin bag, and can be said to be extremely groundbreaking.

Of course, a higher effect of preventing resin contamination can be achieved by combining the means according to the present invention with the conventional resin contamination preventing means devised in a conventional packaging form.

DESCRIPTION OF EMBODIMENTS (Polysilicon Fractured Product)

A polysilicon fractured product according to the present invention is not particularly limited as long as it includes fractured pieces obtained by fracturing a polysilicon rod. For example, it is general to use fractured pieces obtained by fracturing a polysilicon rod, which is obtained by a Siemens method, by a known fracturing method which will be described later.

Figure 1:
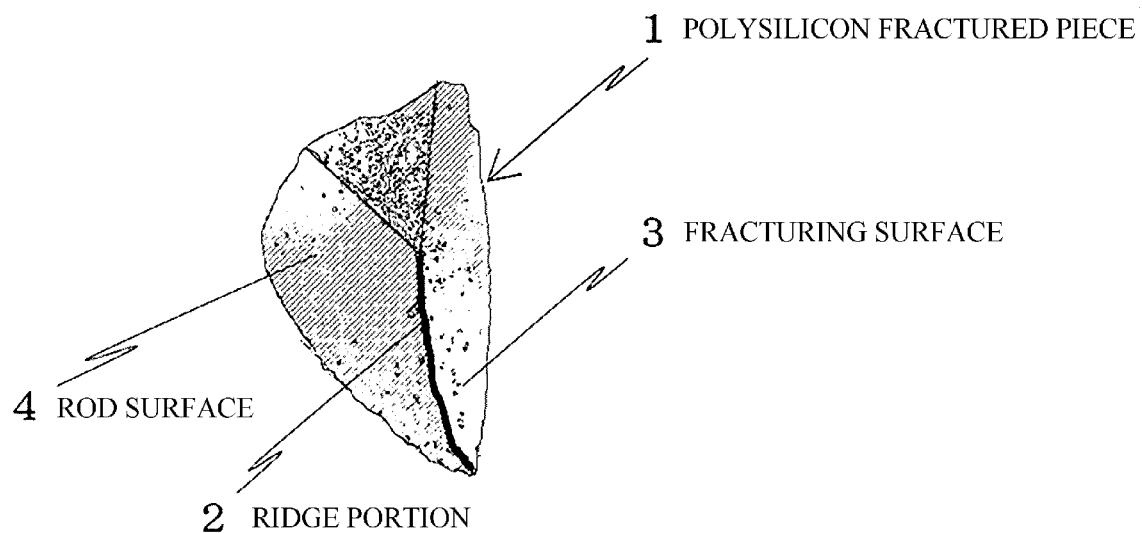
FIG. 1 is a schematic diagram illustrating an example of a fractured piece constituting a polysilicon fractured product according to the present invention.

FIG. 1 is a schematic diagram illustrating a typical form of the fractured piece constituting the polysilicon fractured product according to the present invention.

Referring to FIG. 1, according to the present invention, a polysilicon fractured piece 1 obtained by fracturing the polysilicon rod has a ridge portion 2 formed by a fracturing surface 3 and a polysilicon rod surface 4 formed by fracturing the polysilicon rod, or two fracturing surfaces (not illustrated). The polysilicon fractured piece 1 is an irregular polyhedron, and a surface thereof includes the ridge portion 2 and the fracturing surface 3 or the polysilicon rod surface 4 (hereinafter, may be referred to as "fractured surfaces"). The ridge portion 2 has various angles θ depending on a fracturing method. The angle θ is also referred to as a ridge angle, and is measured from a cut surface obtained by cutting the ridge portion 2 along a plane perpendicular to a ridge line. In the cut surface, the ridge portion 2 is a vertex, and the fractured surfaces appear as sides. The ridge angle θ is an intersection angle of two sides derived from the fractured surfaces. The present invention is characterized in that an average radius of curvature (r) is 50 μm or more, and preferably 60 μm or more at a tip end of the sharp specific ridge portion 2 having a ridge portion angle of 70° or less among ridge portions present in the polysilicon fractured pieces. Regarding the radius of curvature at the tip end, a ratio of ridge portions having a radius of curvature of 30 μm or less is preferably 20% or less, and particularly preferably 10% or less, with respect to all measured portions in a measuring method which will be described later. By including such ridge portions, the polysilicon fractured product according to the present invention can not only prevent generation of a resin powder due to scraping of a resin bag caused by contact with an inner surface of the resin bag, but also can effectively prevent adhesion of a resin to the polysilicon fractured product.

Figure 2:
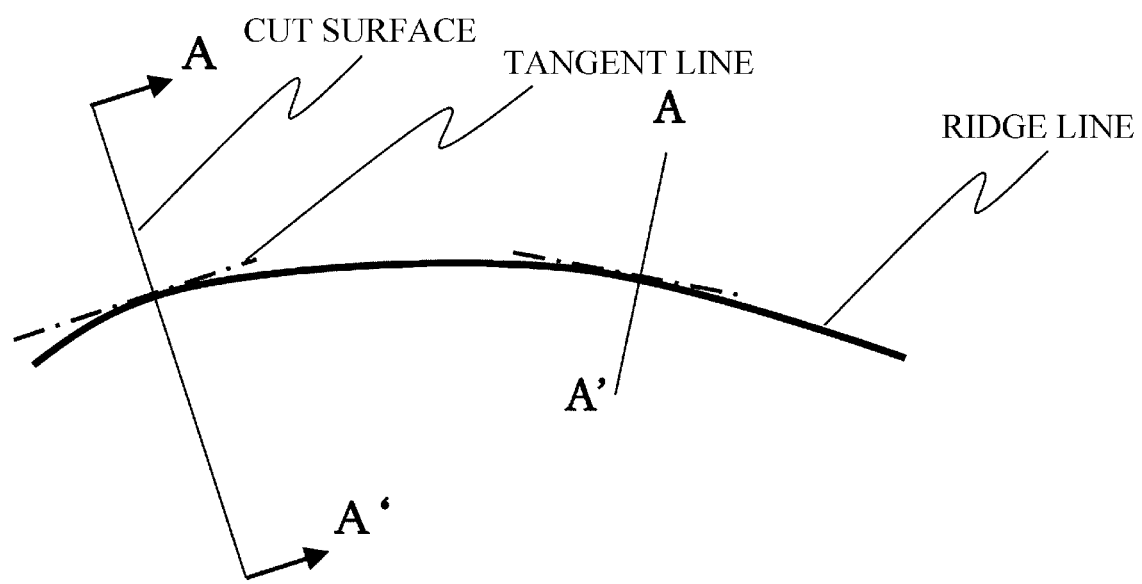
FIG. 2 is a schematic diagram illustrating a method for obtaining a cross section when acquiring an angle and a radius of curvature (r) at a tip end of a ridge portion.
Figure 3:
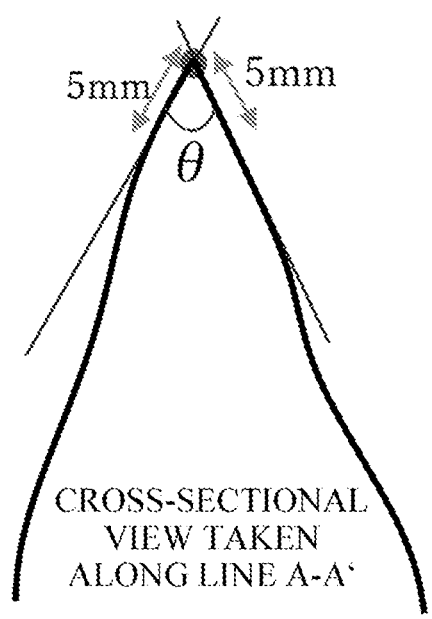
FIG. 3 is a cross-sectional view taken along a line A-A' in FIG. 2, and is a schematic diagram illustrating a method for acquiring the angle of the tip end of the ridge portion.

In the present invention, the specific ridge portion of the fractured pieces constituting the polysilicon fractured product refers to a ridge portion having an angle of 70° or less, which is formed by sandwiching the ridge portion with respect to the cut surface having the ridge portion as a perpendicular line. Here, the cut surface refers to a plane perpendicular to the ridge line of the ridge portion. As illustrated on a right side in FIG. 2, in a portion in which the ridge line is straight, a plane (A-A') perpendicular to the straight line is taken as the cut surface. As illustrated on a left side in FIG. 2, when the ridge line is a curve, a plane (A-A') that perpendicularly intersects a tangent line of the curve at a measurement portion is taken as the cut surface. FIG. 3 illustrates a cross-sectional view taken along the line A-A' in FIG. 2. A top portion in FIG. 3 is a cut point of the ridge line, and curves (sides) continuous from the top portion indicates cut portions of the fractured surfaces. The ridge angle θ is an intersection angle of two sides derived from the fractured surfaces. When measuring the ridge angle θ, a photograph of the cut surface is taken at an equivalent magnification (1), and the ridge angle θ is measured based on this image. When an observation magnification of the cut surface is too high, irregularities on the sides derived from the fractured surfaces may be emphasized, and straight lines may not be drawn. Therefore, at the observation magnification of the equivalent magnification, an image is obtained in which the sides from the top portion to at least about 5 mm are substantially straight, and the ridge angle θ is acquired based on the intersection angle of the two sides. The radius of curvature at the tip end of the specific ridge portion is measured by freely selecting a plurality of fractured pieces having the specific ridge portion from the polysilicon fractured product, acquiring images with a magnification of 30 by scanning electron microscope (SEM) photographs for cut surfaces, and acquiring an average value of the radii of curvature at the tip ends of the ridge portions, which will be described in detail in examples described later. The ridge angle θ and the radius of curvature are measured on three or more cut surfaces arbitrary selected portions from one polysilicon fractured piece, and are measured for a total of 20 or more fractured pieces. The average radius of curvature (r) is the average value of the radii of curvature of ridge portions having a ridge angle θ of 70° or less.

Figure 4:
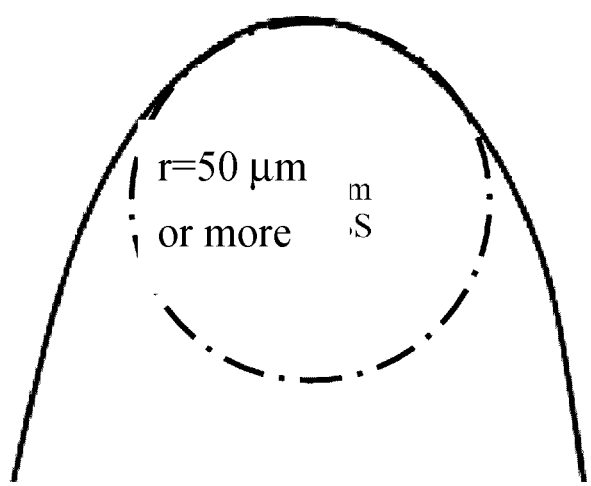
FIG. 4 is a schematic diagram illustrating a method for acquiring the radius of curvature (r) at the tip end of the ridge portion.

At this time, as illustrated in FIG. 4, for determining the radius of curvature (r) at the tip end of the ridge portion, a circle having a radius that matches an arc of the tip end of the ridge portion was drawn, and the radius is defined as the radius of curvature. When the observation magnification is too high, crystal grains in polysilicon are observed, resulting in noise when drawing the circle, and when the observation magnification is about 30, such noise cannot be observed, and a smooth circle can be drawn along the tip end of the ridge portion.

In the present invention, it is necessary for the radius of curvature at the tip end of the ridge portion to satisfy the above range in order to reduce the amount of a resin adhered due to the contact of the polysilicon fractured product with the resin bag and to further reduce the amount of a resin powder generated due to scraping of a resin bag due to the polysilicon fractured product.

Conventionally, the polysilicon fractured product is obtained by fracturing a polysilicon rod and performing a cleaning step including etching, but the radius of curvature at the tip end of the ridge portion is almost the same as that immediately after fracturing, and the ridge portion has a sharp angle. To the contrary, the present invention is successful in obtaining a ridge portion having a specific radius of curvature by subjecting the polysilicon fractured pieces obtained by fracturing the polysilicon rod to a specific etching treatment, which will be described later.

In the present invention, a size of the polysilicon fractured product is not particularly limited. An effect of the present invention is effective for fractured pieces having a mass to a certain extent and easy to move when a resin bag is filled, and thus an average particle diameter calculated by measuring long diameters of particles is preferably 20 mm to 100 mm, and particularly preferably 30 mm to 80 mm.

As described above, the polysilicon fractured product according to the present invention includes ridge portions to which adhesion of the resin due to contact with the resin bag is unlikely to occur, and thus can be used as a polysilicon fractured product with an extremely small amount of a resin adhered when taken out from the resin bag for use after the resin bag is filled, packed, and transported. The adhesion amount of the resin can be reduced to 2 ppm by mass or less, and further to 0.5 ppm by mass or less, and can be suitably used as a raw material for a CZ method or the like. Here, the adhesion amount of the resin is calculated by converting the mass of the resin into the mass of carbon atoms.

In the polysilicon fractured product according to the present invention, it is preferable that a concentration of metal impurities such as iron, chromium, nickel, copper, zinc, sodium, calcium, and tungsten on the surface is 0.1 ppb (in terms of element) or less for each metal, and 2 ppb (in terms of element) or less in total.

In the polysilicon fractured product according to the present invention, although the amount of the resin powder generated by the scraping of the resin due to the contact with the resin bag is extremely small, the adhesion amount of the resin can be reliably reduced by providing a step of removing a fine powder from the polysilicon fractured product taken out from the resin bag, and accordingly, an amount of the resin entrained in a next step, for example, a step of charging the polysilicon fractured product into a crucible used in the CZ method can be reduced to an extremely small amount.

In the present invention, as a material for the resin bag, known resins that can be used for bag making are used without any particular limitation, and an additive-free polyethylene resin is most generally used. It is preferable that a surface of the resin bag that comes into contact with the polysilicon fractured product is as smooth as possible, since friction during the contact with the ridge portion of the polysilicon fractured product is reduced, the effect of the polysilicon fractured product according to the present invention is remarkable, and the amount of the resin adhered to the polysilicon fractured product can be further reduced.

A thickness of a film constituting the resin bag is also not particularly limited, and is generally about 150 μm to 900 μm.

(Method for Producing Polysilicon Fractured Product)

A method for producing the polysilicon fractured product according to the present invention is not particularly limited. For example, a method of rasping the ridge portion having an angle of 70° or less of the polysilicon fractured product can be employed, but this method is less producibility and also causes metal contamination. Therefore, it is preferable to employ a method of treating the ridge portion in an etching treatment for cleaning the surface of the polysilicon fractured product.

That is, the present invention is characterized by including a fracturing step of fracturing a polysilicon rod to obtain fractured pieces, and an etching step of performing etching at an etching speed of 2.5 μm/min or less to achieve an etching depth of 5 μm or more by immersing the fractured pieces obtained in the fracturing step in an etching solution.

In the production method according to the present invention, in the fracturing step, a method of fracturing the polysilicon rod by a known fracturing means is employed without any particular limitation. Specifically, the polysilicon rod to be fractured is preferably produced by the Siemens method. The polysilicon rod is obtained by cutting a connecting portion of a product obtained in a U-shape, and generally has a deposition diameter of 80 mm to 150 mm and a length of about 1000 mm to 2000 mm. Of course, the U-shaped product may be fractured as it is.

The method for fracturing the polysilicon rod is not particularly limited, and a known fracturing method is employed without any particular limitation. Examples thereof include a method using a fracturing apparatus such as a jaw crusher or a roll crusher, and a method of fracturing with a hammer.

After the fracturing, classification may be performed according to an intended use, and in the present invention, as described above, those classified to have an average particle diameter of 20 mm to 100 mm, particularly 30 mm to 80 mm are preferably used. In such classification, it is particularly preferable to remove fractured pieces having a particle diameter of 10 mm or less.

In the production method according to the present invention, in order to obtain a target polysilicon fractured product, it is important to perform etching in an etching solution to achieve an etching depth of 5 μm or more, and preferably 8 μm to 15 μm, at an etching speed of 2.5 μm/min or less, and preferably 1.1 μm/min to 2.5 μm/min, by immersing the fractured product obtained in the fracturing step.

The etching depth is an average etching thickness calculated based on an etching amount.

The present inventors have found that if the above specific conditions are employed in the etching treatment, the tip end of the ridge portion can be preferentially eluted while elution of other portions of the polysilicon fractured product is minimized. That is, when the etching speed is faster than the above range or the etching depth is shallower than the above range, an objective radius of curvature of the specific ridge portion is difficult to achieve.

The etching speed of the etching solution can be adjusted according to conditions such as a composition and a temperature of the etching solution. Here, a known etching solution is used without any particular limitation, and it is preferable to use an etching solution containing hydrofluoric acid and nitric acid, with a hydrofluoric acid concentration of 0.5% by mass to 10% by mass and a nitric acid concentration of 48% by mass to 68% by mass. The etching temperature is preferably 15° C. to 30° C. The etching speed is calculated by a method described in WO 2018/198947. Specifically, a polysilicon test piece whose shape and size are controlled is allowed to coexist in an etching bath, an etching amount is acquired based on a weight change of the polysilicon test piece, and the etching speed is calculated based on an etching time and the etching amount.

In the etching step of the present invention, it is preferable to employ the above etching conditions and to treat the fractured product to be treated while vibrating it in the etching solution since the tip end of the ridge portion can be more preferentially eluted, and the polysilicon fractured product according to the present invention can be obtained with better reproducibility. Preferentially eluting the tip end of the ridge portion means that the etching depth of the tip end of the ridge portion is deeper than those of other portions. As specific etching conditions, it is preferable to perform etching while applying vibration with a vibration frequency of 3 times/min to 10 times/min and a vibration amplitude of 5 mm to 1000 mm, particularly 10 mm to 500 mm. When the vibration frequency and the vibration amplitude for the polysilicon fractured product in the etching solution are increased, new ridge portions may be generated due to friction and collision between the polysilicon fractured products or between the polysilicon fractured product and a cleaning basket. When the polysilicon fractured product is left in the etching solution in a still state, the effect of preferentially etching the ridge portion tends to decrease.

Therefore, by applying the appropriate vibration to the fractured product in the etching solution and performing the etching, the tip end of the ridge portion can be more effectively etched, and the polysilicon fractured product including an objective ridge portion can be more reliably obtained.

In the above method, the effect can be achieved by any vibration mode such as vertical vibration, horizontal vibration, or vertical-horizontal composite vibration. The etching is generally performed by charging the polysilicon fractured product to be treatment in a known cleaning basket.

According to the method of the present invention, since the tip end of the ridge portion is treated by etching, no fine powder is generated due to the removal of the tip end, and since cleaning is performed during the etching, an amount of the fine powder present in the obtained polysilicon fractured product can be reduced to a very small amount. Specifically, a content of the fine powder in the polysilicon fractured product may be 200 ppmw or less, particularly 100 ppmw or less for a fine powder with 500 µm to 1000 µm, and 20 ppmw or less, particularly 10 ppmw or less for a fine powder less than 500 µm.

In the production method according to the present invention, known treatments are employed as treatments after the etching in the etching step without any particular limitation. For example, the polysilicon fractured product is shipped after being subjected to a cleaning treatment with ultrapure water and a drying treatment.

As a shipping method, a known packaging method and a known transportation method can be employed without any particular limitation. For example, a resin bag is automatically or manually filled with the polysilicon fractured product, an opening is sealed, and if necessary, the resin bag is stored in a cardboard box before being shipped.

EXAMPLES

Hereinafter, Examples will be shown to more specifically explain the present invention, but the present invention is not limited to these Examples.

In Examples, various measurements were performed by the following methods.

(1) Radius of Curvature (r) at Tip End of Specific Ridge Portion of Polysilicon Fractured Product Any 20 fractured pieces including the ridge portion (specific ridge) having an angle ($\theta$) of 70° or less were taken out from 5 kg of the polysilicon fractured product, sealed one by one with an acrylic resin, and cut at three portions such that a cut surface intersecting perpendicularly to the tangent line of the ridge line of the specific ridge portion was generated, an SEM photograph with a magnification of 30 was taken for each cut surface, and the angle ($\theta$) of the ridge portion and the radius of curvature (r) at the tip end of the ridge portion were measured in the obtained images. As illustrated in FIG. 4, the radius of curvature (r) at the tip end of the ridge portion was the radius of the circle matching the shape of the arc of the tip end of the ridge portion.

(2) Resin Adhesion Test

A gusset-shaped resin bag made of a polyethylene resin and having a thickness of 250 µm and a bottom surface of 130 mm square was filled with 5 kg of the polysilicon fractured product, and an opening was fused. Further, the gusset-shaped resin bag was further contained in a gusset-shaped resin outer bag made of a polyethylene resin and having a thickness of 250 µm and a bottom surface of 160 mm square, and an opening was fused. Six cardboard boxes each having a bottom surface of 175 mm square and a height of 240 mm were packed in an outer cardboard box having a length of 550 mm, a width of 370 mm, and a height of 270 mm, the polysilicon fractured product with which the polyethylene resin bag was filled was contained in each of the cardboard boxes, and then the cardboard boxes were loaded onto a truck and a one-way transportation test of 200 km was performed. When a vibration degree during the transportation was measured with a vibration meter, a maximum vibration acceleration at a resultant force was 5 Gal. After the transportation test was completed, the polysilicon fractured product with which the polyethylene resin bag was filled was taken out from the cardboard to measure the adhesion amount of the resin.

(3) Measurement of Adhesion Amount of Polyethylene Resin to Polysilicon Fractured Product The polysilicon fractured product to which the polyethylene resin was adhered was maintained at a temperature of 250° C. for 30 minutes or longer in an inert gas atmosphere to remove an organic volatile component, and then the temperature of the polysilicon fractured product was raised to 380° C. under a flow of an inert gas to collect a generated resin decomposition product. With respect to the resin decomposition product, a peak intensity derived from linear unsaturated hydrocarbon, which was a decomposition product unique to the polyethylene resin, was measured, and the adhesion amount of the polyethylene resin to the polysilicon fractured product was acquired based on a calibration curve separately prepared by the collection and analysis of the gas generated by heating a sample of the polysilicon fractured product to which a known amount of polyethylene resin was adhered.

The measurement of the adhesion amount of the polyethylene resin was performed before and after the resin adhesion test, and a value obtained by subtracting a measurement value before the resin adhesion test from a measurement value after the resin adhesion test was shown as the adhesion resin amount.

(4) Amount of Fine Silicon Powder in Polysilicon Fractured Product

About 1 kg of the polysilicon fractured product was charged into a 2 L beaker, and 1 L of ultrapure water was added thereto such that the polysilicon fractured product was completely immersed therein. The beaker was slowly shaken from side to side such that the surface of the polysilicon fractured product was completely brought into contact with the ultrapure water, and the fine powder on the surface was suspended in the ultrapure water. The obtained suspension of the fine powder was passed through a 1000 μm mesh filter, and then passed through a 500 μm mesh filter, and then the fine powder was collected with a 1 μm mesh filter paper. The 500 μm mesh filter and the 1 μm mesh filter paper, which were used for collection, were dried in a dryer at 110° C. for 12 hours or longer. The mass of the fine powder with 500 μm to 1000 μm collected from the 500 μm mesh filter was calculated, and the mass of the fine powder less than 500 μm was calculated based on a filter paper mass difference before and after the collection of the fine powder. The polysilicon fine powder content was calculated using the mass of the polysilicon used in the analysis. This operation was performed again, and each newly calculated polysilicon fine powder content was added to the previously calculated value. Further, this operation was repeated until the amount of increase due to this addition reached a constant value within 5% with respect to the content before the addition, and a value obtained by a final addition was used as a final value to determine the polysilicon fine powder content.

Example 1

Polysilicon fractured pieces having an average particle diameter of 64 mm and a particle diameter in a range of 40 mm to 80 mm, which were obtained by fracturing a polysilicon rod having a diameter of 150 mm and a length of 1000 mm with a hammer and performing classification, were subjected to an etching treatment under the following conditions, and then were washed with ultrapure water and dried to obtain polysilicon fractured product.

In a mixed solution containing 50% nitric acid for the electronic industry and 1.5% hydrofluoric acid for the electronic industry, an etching basket containing the polysilicon fractured pieces were vertically vibrated at 25 times/min with a vibration amplitude of 150 mm, and the etching was performed while controlling a temperature of the mixed solution such that a solution temperature was 20° C. to 28° C.

In the above etching step, an etching speed, which was calculated based on the weight change of the polysilicon test piece in the etching basket together with the polysilicon fractured pieces, was 2.1 μm/min, and the etching was ended when achieving an etching depth of 8 μm, and after cleaning with ultrapure water and drying, a polysilicon fractured product was obtained.

Figure 5:
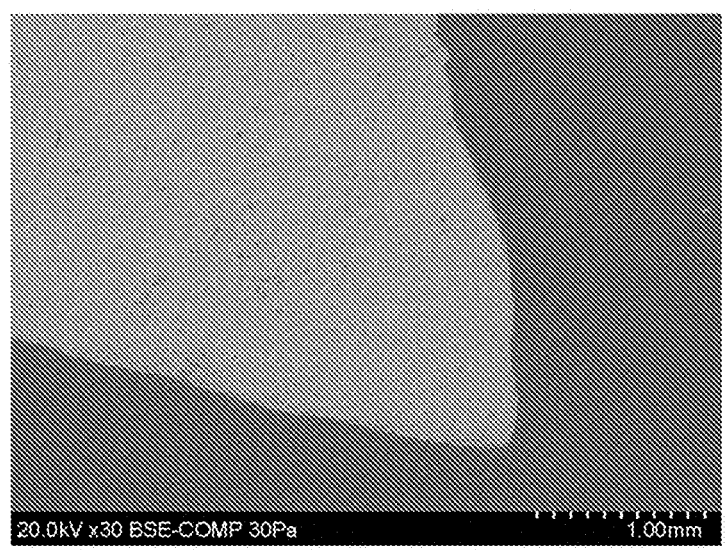
FIG. 5 is a typical SEM photograph with a magnification of 30 illustrating a state of a tip end of a ridge portion of a polysilicon fractured product obtained in Example 1.

With respect to the obtained polysilicon fractured product, the angle (θ) at ridge portions of fractured pieces and the radii of curvature (r) at tip ends of specific ridge portions were measured, and an average value of the radii of curvature (r) and a ratio of a ridge portion having a radius of curvature of 30 μm or less were calculated. Results are shown in Table 1. FIG. 5 shows a typical SEM photograph with a magnification of 30 for observing the tip end of the ridge portion of the obtained polysilicon fractured product. Further, the amount of the polysilicon fine powder in the polysilicon fractured product is also shown in Table 1.

The obtained polysilicon fractured product was subjected to the resin adhesion test to measure the adhesion amount of the resin. Results are also shown in Table 1.

Comparative Example 1

A polysilicon fractured product was obtained in the same manner as in Example 1 except that the etching treatment was performed to achieve an etching depth of 3 μm.

Figure 6:
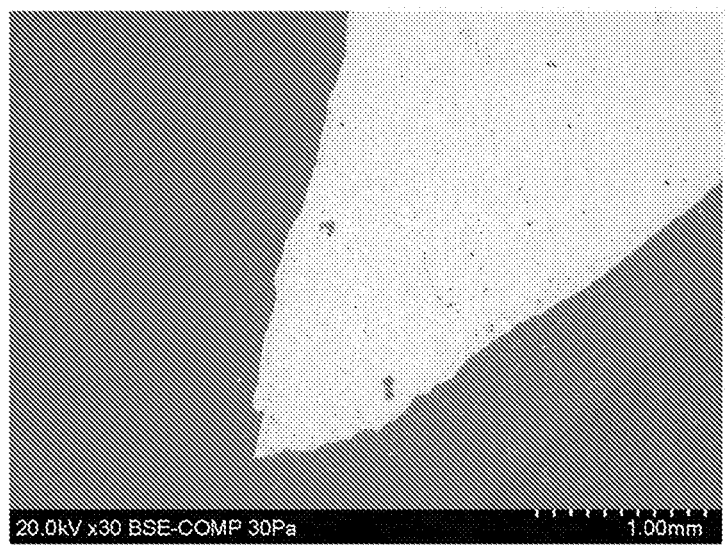
FIG. 6 is a typical SEM photograph with a magnification of 30 illustrating a state of a tip end of a ridge portion of a polysilicon fractured product obtained in Comparative Example 1.

The polysilicon fractured product was evaluated in the same manner as in Example 1. Results are shown in Table 1. FIG. 6 shows a typical SEM photograph with a magnification of 30 for observing a tip end of a ridge portion of the obtained polysilicon fractured product.

Example 2

A polysilicon fractured product was obtained in the same manner as in Example 1 except that polysilicon fractured pieces having an average particle diameter of 92 mm and a particle diameter in a range of 70 mm to 110 mm were used as the polysilicon fractured pieces.

The polysilicon fractured product was evaluated in the same manner as in Example 1. Results are also shown in Table 1.

Example 3

A polysilicon fractured product was obtained in the same manner as in Example 1 except that the etching treatment was performed to achieve an etching depth of 11 μm for the polysilicon fractured pieces.

The polysilicon fractured product was evaluated in the same manner as in Example 1. Results are also shown in Table 1.

TABLE 1

| | Etching condition | | Average particle diameter mm | Angle of ridge portion ° | Average radius of curvature μm | Ratio of ridge portion having radius of curvature of 30 μm or less % | Polysilicon fine powder content | | Resin adhesion test Surface carbon concentration after truck transportation ppbw |
|---|---|---|---|---|---|---|---|---|---|
| | Etching speed μm/min | Etching depth μm | | | | | 500 μm to 1000 μm ppbw | 500 μm> ppbw | |
| Example 1 | 2.1 | 8 | 64 | 23 to 52 | 99 | 8 | 80 | 7 | 70 |
| Comparative Example 1 | 2.1 | 3 | 64 | 24 to 56 | 31 | 60 | 82 | 8 | 184 |
| Example 2 | 2.1 | 8 | 92 | 22 to 53 | 97 | 8 | 74 | 6 | 57 |
| Example 3 | 2.1 | 11 | 64 | 23 to 51 | 115 | 6 | 77 | 6 | 60 |

REFERENCE SIGNS LIST

1 Polysilicon fractured piece
2 Ridge portion
3 Fracturing surface
4 Rod surface

The invention claimed is:

1. A polysilicon fractured product comprising:
fractured polysilicon pieces having a ridge portion generated by fracturing a polysilicon rod,
wherein an average radius of curvature (r) at a tip end of a ridge portion having an angle of 70° or less of the fractured pieces is 60 μm or more, and
a ratio of ridge portions having a radius of curvature of 30 μm or less is 20% or less with respect to all measured ridge portions present in the fractured polysilicon pieces.

2. The polysilicon fractured product according to claim 1, wherein an average particle diameter is 20 mm to 100 mm.

3. The polysilicon fractured product according to claim 1, wherein the pieces have an average particle diameter of 30 mm to 80 mm.

4. The polysilicon fractured product according to claim 1, wherein a fractured piece is in the shape of an irregular polyhedron having a surface that includes the ridge portion.

5. A polysilicon fractured product according to claim 1, wherein the ridge portion comprises a side formed by a fractured surface (3) of a polysilicon rod and a side formed by a polysilicon rod surface (4).

6. A polysilicon fractured product according to claim 1, wherein the ridge portion is a vertex formed by a side formed by a fractured surface (3) of a polysilicon rod and a side formed by a polysilicon rod surface (4) and the angle is formed by the two sides.

7. A polysilicon fractured product according to claim 1, wherein an average radius of curvature at a tip end of a ridge portion having an angle of 22° to 70° of the fractured pieces is 60 μm to 115 μm.

8. A polysilicon package filled with the polysilicon fractured product according to claim 1 in a resin bag.

9. The polysilicon fractured product according to claim 1, wherein a ratio of a ridge portions having a radius of curvature of 30 μm or less is 8% or less, with respect to all measured ridge portions present in the fractured polysilicon pieces.

10. The polysilicon fractured product according to claim 1, wherein a content of polysilicon fine powder is 200 ppmw or less for a fine powder of 500 μm to 1000 μm.

11. The polysilicon fractured product according to claim 1, wherein a concentration of metal impurities on the surface of the product is 2 ppb or less.

12. The polysilicon fractured product according to claim 1, wherein a concentration of iron, chromium, nickel, copper, zinc, sodium, calcium, and tungsten on a surface of the product is 0.1 ppb or less in terms of element for each metal.

13. A polysilicon package according to claim 8, wherein the resin bag comprises a film having a thickness of about 150 μm to 900 μm.

14. A polysilicon package filled with the polysilicon fractured product according to claim 2 in a resin bag.

15. A polysilicon package according to claim 8, wherein the resin bag comprises a polyethylene resin.

16. The polysilicon fractured product according to claim 1, wherein a ratio of a ridge portions having a radius of curvature of 30 μm or less is 10% or less, with respect to all measured ridge portions present in the fractured polysilicon pieces.

17. A method for producing a polysilicon fractured product according to claim 1, comprising:
fracturing a polysilicon rod to obtain fractured pieces; and
etching at an etching speed of 2.5 μm/min or less to achieve an etching depth of 5 μm or more by immersing the fractured pieces obtained in the fracturing in an etching solution consisting essentially of a mixed acid aqueous solution containing 0.5% by mass to 10% by mass of hydrofluoric acid and 48% by mass to 68% by mass of nitric acid, while applying vibration with a vibration frequency of 3 times/min to 10 times/min and a vibration amplitude of 5 mm to 1000 mm.

* * * * *